United States Patent
Fournier et al.

(10) Patent No.: US 10,748,071 B2
(45) Date of Patent: Aug. 18, 2020

(54) METHOD AND SYSTEM FOR COMPLEX EVENT PROCESSING WITH LATENCY CONSTRAINTS

(71) Applicant: International Business Machines Corporation, Armonk, NY (US)

(72) Inventors: Fabiana Fournier, Givat Ela (IL); Alexander Kofman, Haifa (IL); Mordechai Nisenson, Kiryat Tivon (IL); Inna Skarbovsky, Kiryat Ata (IL)

(73) Assignee: International Business Machines Corporation, Armonk, NY (US)

( * ) Notice: Subject to any disclaimer, the term of this patent is extended or adjusted under 35 U.S.C. 154(b) by 976 days.

(21) Appl. No.: 14/986,743

(22) Filed: Jan. 4, 2016

(65) Prior Publication Data
US 2017/0195204 A1 Jul. 6, 2017

(51) Int. Cl.
*G06N 7/00* (2006.01)
*G06F 11/34* (2006.01)

(52) U.S. Cl.
CPC ......... *G06N 7/005* (2013.01); *G06F 11/3419* (2013.01); *G06F 11/3452* (2013.01); *G06F 2201/86* (2013.01)

(58) Field of Classification Search
None
See application file for complete search history.

(56) References Cited

U.S. PATENT DOCUMENTS

| | | | |
|---|---|---|---|
| 8,543,534 B2 * | 9/2013 | Alves | G06F 9/541 707/600 |
| 2013/0046725 A1 | 2/2013 | Cammert et al. | |
| 2013/0160024 A1 | 6/2013 | Shtilman et al. | |
| 2013/0325787 A1 * | 12/2013 | Gerken | G06N 7/005 706/52 |
| 2014/0052431 A1 | 2/2014 | Engel et al. | |
| 2014/0350888 A1 * | 11/2014 | Gesmann | G06F 11/30 702/183 |
| 2015/0286684 A1 * | 10/2015 | Heinz | G06F 16/24549 707/769 |
| 2016/0154692 A1 * | 6/2016 | Heinz | G06F 11/0772 714/2 |

(Continued)

FOREIGN PATENT DOCUMENTS

| | | | | |
|---|---|---|---|---|
| EP | 2871577 | | 5/2015 | |
| WO | 2013182815 | | 12/2013 | |
| WO | WO-2013182915 A2 * | | 12/2013 | ............. G06N 7/005 |

OTHER PUBLICATIONS

Luckham, David. The power of events. vol. 204. Reading: Addison-Wesley, 2002. (Year: 2002).*

(Continued)

*Primary Examiner* — Alexey Shmatov
*Assistant Examiner* — Casey R. Garner
(74) *Attorney, Agent, or Firm* — Barry Blount (57) ABSTRACT

A computer-implemented method, computerized apparatus and computer program product, the method comprising: receiving a latency constraint on a Complex Event Processing (CEP) computation; monitoring progress of the CEP computation to determine a risk of violating the latency constraint; and, responsive to determining that a risk of violating the latency constraint exists, outputting at least one possible result of the CEP computation.

21 Claims, 3 Drawing Sheets

(56) References Cited

U.S. PATENT DOCUMENTS

2017/0099200 A1* 4/2017 Ellenbogen ............. H04L 43/04
2019/0104028 A1* 4/2019 Sahu ..................... H04L 41/147

OTHER PUBLICATIONS

Dayal, Umeshwar, Barbara Blaustein, Alex Buchmann, Upen Chakravarthy, Meichun Hsu, R. Ledin, Dennis McCarthy et al. "The Hipac project: Combining active databases and timing constraints." ACM Sigmod Record 17, No. 1 (1988): 51-70. (Year: 1988).*

Masud, Mohammad, Jing Gao, Latifur Khan, Jiawei Han, and Bhavani M. Thuraisingham. "Classification and novel class detection in concept-drifting data streams under time constraints." IEEE Transactions on Knowledge and Data Engineering 23, No. 6 (2011): 859-874. (Year: 2011).*

Magid, Yonit, Asaf Adi, Maya Barnea, David Botzer, and Ella Rabinovich. "Application generation framework for real-time complex event processing." In 2008 32nd Annual IEEE International Computer Software and Applications Conference, pp. 1162-1167. IEEE, 2008. (Year: 2008).*

Ottenwälder, Beate, Boris Koldehofe, Kurt Rothermel, and Umakishore Ramachandran. "MigCEP: operator migration for mobility driven distributed complex event processing." In Proceedings of the 7th ACM international conference on Distributed event-based systems, pp. 183-194. ACM, 2013. (Year: 2013).*

Paschke, Adrian, Alexander Kozlenkov, and Harold Boley. "A homogeneous reaction rule language for complex event processing." arXiv preprint arXiv:1008.0823 (2010). (Year: 2010).*

Zaharia, Matei, Tathagata Das, Haoyuan Li, Timothy Hunter, Scott Shenker, and Ion Stoica. "Discretized streams: Fault-tolerant streaming computation at scale." In Proceedings of the twenty-fourth ACM symposium on operating systems principles, pp. 423-438 . ACM, 2013. (Year: 2013).*

Chandramouli, Badrish, Jonathan Goldstein, Roger Barga, Mirek Riedewald, and Ivo Santos. "Accurate latency estimation in a distributed event processing system." In 2011 IEEE 27th International Conference on Data Engineering, pp. 255-266. IEEE, 2011. ( Year: 2011).*

Yongluan Thou et al., "Sequence Pattern Matching over Event Data with Temporal Uncertainty", 2014, pp. 205-2016 , Can be found at: http://openproceedings.org/EDBT/2014/paper_344.pdf.

An Oracle White Paper., "Oracle Complex Event Processing Performance", Oracle Complex Event Processing PerformanceUpdated Nov. 2008, p. 8&9, Can be found at: http://www.oracle.com/technetwork/middleware/complex-event-processing/overview/cepperformancewhitepaper-128060.pdf.

Gianpaolo Cugola et al., "Introducing Uncertainty in Complex Event Processing: Model, Implementation, and Validation", Article in Computing, Feb. 2015, vol. 97, issue 2, pp. 103-144, First online: May 10, 2014.

Alexander Artikis et al., "Event Processing Under Uncertainty", International Conference on Distributed Event-Based Systems (DEBS), pp. 32-43, ACM, 2012.

Elias Alevizos et al., "Complex Event Recognition under Uncertainty: A Short Survey", In Proceedings of Event Processing, Forecasting and Decision-Making in the Big Data Era (EPForDM), EDBT/ICDT Workshops. pp. 97-103, 2015.

* cited by examiner

METHOD AND SYSTEM FOR COMPLEX EVENT PROCESSING WITH LATENCY CONSTRAINTS

TECHNICAL FIELD

The present disclosure relates to complex event processing in general, and to complex event processing with latency constraints, in particular.

BACKGROUND

Event Processing (EP) or Complex Event Processing (CEP) is a discipline that aims at identifying of and responding to relatively complex situations based on simpler events detected. EP or CEP can be depicted as the bridge between the occurrence of events, and the reaction through an adaptation that is required by the situation. A situation may be triggered by the observation of a raw event, but is more typically obtained by detecting a pattern over the flow of events. For example, a pattern consisting of multiple transactions with a single debit card performed on locations distant from each other by over 100 kilometers within less than 30 minutes may indicate a financial fraud situation.

A CEP system receives events from multiple sources, also referred to as "event producers", routes these events, filters them, transforms them, aggregates them, detects patterns over multiple events, and emits derived/output events from the event processing system to one or more end destinations, also referred to as "event consumers".

A complete definition set made up of these functions is known as an Event Processing Network (EPN). An EPN is a conceptual model, describing the event processing flow execution. An EPN comprises a collection of Event Processing Agents (EPAs), event producers, and event consumers. A single EPA may implement a function or an operator applied on incoming input events, such as AND, OR, SEQ, NOT (also referred to as "absence" operator), or the like. An outcome of one EPA, i.e. a derived event, may be provided as input to another EPA, and so forth.

One major performance objective for an event processing application relates to latency. Latency, or response time, is an important performance metric in IT systems. In some domains the acceptable latency limits are very strict and challenging. On the other hand, complexity of software is continuously increasing, as well as the complexity of the problems it is solving. Latency applied to CEP with regards to the present disclosure refer to the elapsed time from receipt of an input event to emission of the corresponding derived event. Sometimes real-time applications impose particular performance upper limits for either processing of a certain event type, or for a certain EPA implementing an intermediate calculation. Some CEP computations can be time consuming, and involve waiting until arrival of a specific event, timeouts, joins, time-related operations, or the like. All these may impact the latency.

BRIEF SUMMARY

One exemplary embodiment of the disclosed subject matter is a computer-implemented method comprising: receiving a latency constraint on a Complex Event Processing (CEP) computation; monitoring progress of the CEP computation to determine a risk of violating the latency constraint; and, responsive to determining that a risk of violating the latency constraint exists, outputting at least one possible result of the CEP computation.

Another exemplary embodiment of the disclosed subject matter is a computerized apparatus having a processor, the processor being adapted to perform the steps of: receiving a latency constraint on a Complex Event Processing (CEP) computation; monitoring progress of the CEP computation to determine a risk of violating the latency constraint; and, responsive to determining that a risk of violating the latency constraint exists, outputting at least one possible result of the CEP computation.

Yet another exemplary embodiment of the disclosed subject matter is a computer program product comprising a computer readable storage medium retaining program instructions, which program instructions when read by a processor, cause the processor to perform a method comprising: receiving a latency constraint on a Complex Event Processing (CEP) computation; monitoring progress of the CEP computation to determine a risk of violating the latency constraint; and, responsive to determining that a risk of violating the latency constraint exists, outputting at least one possible result of the CEP computation.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to provide for CEP that accommodates latency requirements, whether imposed by end users, clients, developers, or the like. In various practical situations, an uncertain or inaccurate result provided within the time limit is preferable than not responding on time. For example, in situations of fraud detection, one may prefer enhancing the chances for an early discovery rather than late, even in the price of increased false alerts rate.

One technical solution is to identify situations in which performing the full CEP computation along the event detection path would take too long. Instead of completing the long path and obtaining the actual result (which may be prohibited in view of a maximal latency restriction), a replacement thereof is provided in the form of a default or an approximated result, optionally with associated confidence level value, indicating the probability of that result being correct. For example, in case a partial pattern of fraud situation emerges, an output such as "fraud with likelihood of 50%" may be issued, without awaiting corroboration of the remainder of the pattern, whether by further processing or arrival of subsequent events.

In some exemplary embodiments, progress of the CEP computation may be monitored in order to detect a risk of violating the maximal latency limit, in which case the corresponding CEP computation may optionally be cut or suspended. Additionally or alternatively, portions of the CEP computation, or even the CEP computation in its entirety, may be skipped in order to satisfy latency limits, such as, for example, in cases where one can determine in advance that they cannot be completed in time.

In some exemplary embodiments, a relative latency contributed by each EPA to the total latency of a computation path may be estimated. An initial rough estimation may be used at start and adjusted further along the way based on observed measurements. A latency budget for each EPA along the path may be computed based on the estimated relative latency and the maximal total latency. The actual latency of each EPA may be monitored, such as by registering the time of receiving the first input event and the time of emitting the corresponding output event. In case the EPA cannot complete within the budgeted limit, an uncertain event may be emitted, and the computation may optionally be halted or paused. In case the EPA completes earlier than the budgeted limit, the budget of the downstream EPAs or portion thereof may be updated according to predetermined distribution rules, such as respective to their relative budgets, for example. The procedure may be performed for each path in the EPN for which a latency constraint is required to be met.

In some exemplary embodiments, one or more possible results may be maintained and provided as output instead of providing the result of the full CEP computation path, which may not be available yet. In some exemplary embodiments, a respective confidence level may be maintained for each of the one or more possible results and provided along therewith at the output stage. In some exemplary embodiments, only the potential derived event with the highest confidence level may be outputted. In some exemplary embodiments, partial results of the CEP computation may be collected and the confidence levels for the set of possible outcomes may be updated based thereon.

In some exemplary embodiments, confidence levels may be computed using an uncertainty propagation approach. The uncertainty of the input events may be propagated to the derived events in a coherent way from a mathematical, probabilistic perspective. Uncertainty in input events may be admitted by defining a mechanism that maps the probability values attached on them to uncertainty quantifications on the derived, complex events. A similar formula may be utilized to estimate the uncertainty of complex events that are comprised of other complex events and/or primitive ones. Given an operator such as SEQ, AND, OR and so on, a matched pattern responsible for the detection of a complex event may receive uncertainty values based on assumptions made regarding the independence or dependence of the events received as input. For this purpose, one of several approaches such as Independence of events, Markovian property adoption, Bayesian Network construction, or the like, may be used.

In some exemplary embodiments, an uncertainty elimination approach may be taken, such that whenever uncertainty arises, it is eliminated before derivation is carried out. Uncertain events may be screened out, according to some predefined policy. An exemplary policy may be to apply a threshold, such that if an event has a certainty smaller than this threshold it is discarded, and otherwise it is treated as certain. Once the uncertainty is removed, the events may be processed regularly.

One technical effect of utilizing the disclosed subject matter is to provide a framework for CEP that allows trading off accuracy for speed. An EPN branch, such as a sub-network or a single EPA, may be associated with a set of functions having different performance characteristics and associated accuracy level. For example, each function may be associated with either a distribution of time to complete and an uncertainty distribution, or a combined distribution of uncertainty over computation time. The uncertainty values may be high at the beginning, and the results may get more accurate the longer the time spent for the calculation. Based on the calculation time and certainty parameters, a selection of function that would yield the best result with respect to given target metrics may be made. The target metrics may be latency based, e.g., the most accurate answer within the time limit, throughput based, e.g., the ratio of certainty level to calculation time, or the like. The function selection may be made either dynamically or off-line, depending for example on the latency limits being subject to changes during execution or fixed. In some exemplary embodiments, the selection may be directed to achieve optimal results on a global scale, e.g. over a plurality of EPN branches or the whole network, thus requiring determinations of when it is better to use a less accurate answer at certain points. For example, in case that the computation consists of several different stages, and a total time constraint for completing all the stages is imposed, it may be preferable to use a slightly-less accurate result in one stage so as to have more time to achieve a much more accurate result at another stage. Similarly, alternative or additional Key Performance Indicators (KPIs) or other performance measures may be optimized. Additionally or alternatively, an early termination may be applied where a result of a good enough accuracy is achieved, e.g. with relation to a predetermined threshold.

As an illustrative example, consider a simple case in which a calculation is required to be generated together with an uncertainty level, and a function for performing it which takes a certain amount of time is provided. A static result may be pre-computed and maintained along with the function. Under given latency constraints, a determination may be made whether and when it would be advantageous to not perform the longer calculation, but rather use the immediate, less accurate result. Alternatively, the latency limit may be employed as a timeout for the output of the function, such that the static value is used unless the function is able to complete on time. Similarly, a generalized staged approach may be taken, wherein a set of simpler functions with varying degrees of accuracy and speed is used for calculating the answer more quickly, although less accurately, and only when the slower answer is unavailable the closest quicker result is utilized.

In some exemplary embodiments, the computation may run sequentially or in parallel. A sub-network of the EPN may be encapsulated by holding emission of events until computation by a remainder portion of the EPN completes, or a timeout expires. The event emitted at that point may be either the most certain potential event, or a default event if none are available. Once the timeout has expired, the sub-network may be cleared from the previous work. Alternatively, the sub-network may be paused and preserved in that state in order to resume calculation later if there remains sufficient time.

Figure 1:
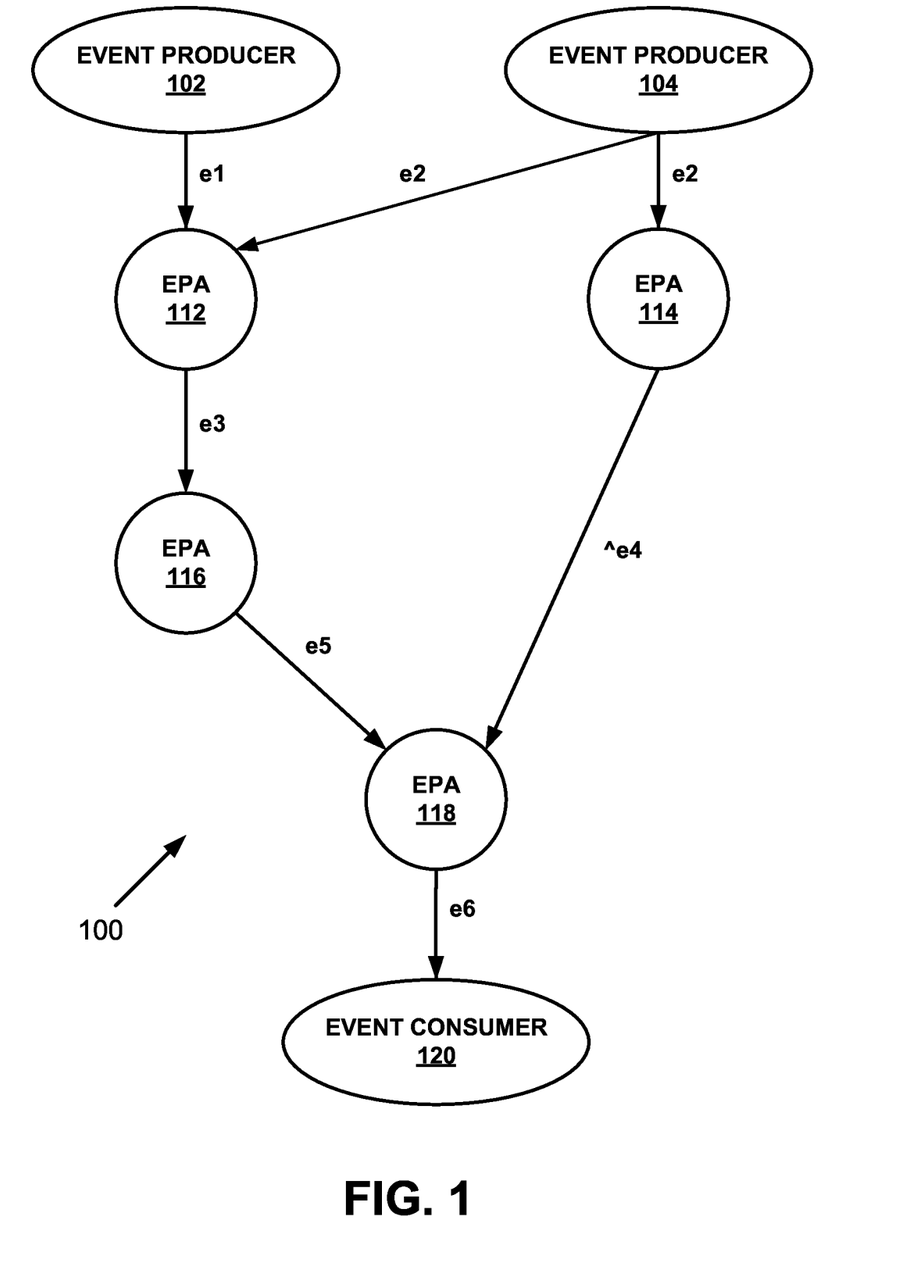
FIG. 1 shows a schematic exemplary environment in which the disclosed subject matter is used, in accordance with some exemplary embodiments of the subject matter.

Referring now to FIG. 1 showing a schematic exemplary environment in which the disclosed subject matter is used, in accordance with some exemplary embodiments of the subject matter.

An exemplary EPN 100 may represent the dataflow of a CEP computation as a directed graph. EPN 100 may comprise one or more Event Producers, such as 102 and 104, one or more Event Consumers, such as 120, and one or more EPAs, such as 112, 114, 116 and 118. The graph of EPN 100 may represent event flow from Event Producers 102 and 104 to Event Consumer 120 through EPA nodes 112 to 118. The labels on the edges may denote events sent between the nodes. In some exemplary embodiments, Event Producer 102 may produce input event e1, and Event Producer 104 may produce input event e2. EPA 112 may receive the input events e1 and e2, and may emit internal event e3. EPA 112 may emit e3 only after receiving both e1 and e2. Similarly, EPA 114 may emit internal event e4 upon receiving of e2 only if the contents of e2 match a certain condition. EPA 116 may receive e3 and emit internal event e5. Finally, EPA 118 may emit output event e6 to Event Consumer 120 after e5 is received and e4 has not arrived during a certain time period, whereby implementing the "absence" type operator.

In some exemplary embodiments, the latency of the computation by EPN 100 may be measured as the elapsed time between receiving of the earliest between input events e1 and e2 by EPA 112 and emitting output event e6 by EPA 118. In some exemplary embodiments, such as in time-critical systems, the additional latency caused by the network delay while transmitting input and output events from event producers to the EPAs and from EPAs to event consumers may also be taken into account.

In some exemplary embodiments, the total latency of EPN 100 may be composed of the respective latencies of the EPAs 112 to 118, represented in the following formula:

$$\text{total\_latency}=\text{latency}(\text{EPA 112})+\text{latency}(\text{EPA 116})+\text{latency}(\text{EPA 118}) \quad (1)$$

For an EPA implementing the "absence" operator, the latency may always equal the length of the temporal window, as this EPA may always be evaluated in the deferred mode, i.e., at the end of the temporal context. Therefore the latency of EPA 114 in the exemplary EPN 100 may not contribute to the total latency, because if the computation in EPA 114 is delayed, e6 may be emitted at the end of the temporal window specified in the definition of EPA 118. Such delay might impact the correctness of the CEP derivation, but not the latency.

For EPAs implementing other operator types, the latency may be calculated from the first event received at the EPA until the pattern matching is satisfied, either in the immediate or deferred mode, as herein described.

In some exemplary embodiments, computation by an EPA implementing the "absence" operator may also be cut short in time, so as to allow completion of the processing within time constraint. In some exemplary embodiments, in case the defined window length may be shortened, and if during the shortened time window, no e4 event is detected, as required by such operator, the output event (e6) may be emitted with a confidence level that is based on the proportion between the shortened time window and the defined window length. For example, if instead of waiting five minutes, the time window was reduced to only three minutes, than the confidence level may be about $3/5=60\%$.

In some exemplary embodiments, a predictive model for estimating an expected time for completing computation by an EPA may be used. The expected processing time may be compared to the budgeted or total latency limit to determine whether time limits may or may not be satisfied. In some exemplary embodiments, if a computation at an upstream EPA along a computation path leading to an "absence" type EPA is expected to be delayed, the confidence level of the emitted event may be adjusted accordingly. For example, in case of an expected delay at EPA 114 in processing e2, such that e4 may not be emitted on time, the confidence level of e6 may be decreased as to reflect that it might be a false positive. The uncertainty level for a derived/output event due to delayed input from internal EPN nodes may be proportional to a ratio between the expected delay and expected total processing time. For example, if a delay of two minutes is expected for a computation that should have completed within three minutes, thus resulting in a total expected processing time of five minutes, than the uncertainty level may be about $2/5=40\%$.

Figure 2:
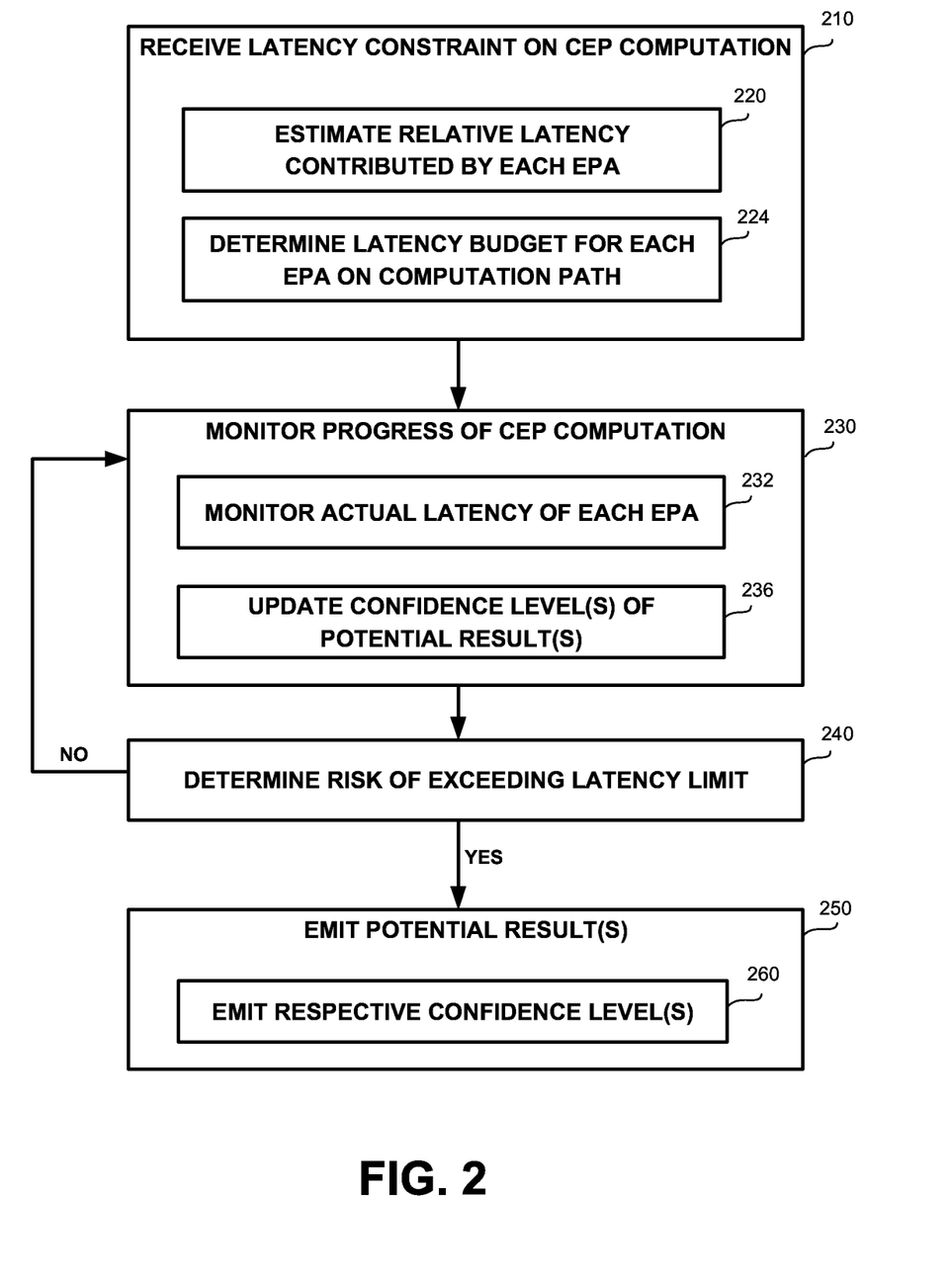
FIG. 2 shows a flowchart diagram of a method, in accordance with some exemplary embodiments of the subject matter.

Referring now to FIG. 2 showing a flowchart diagram of a method, in accordance with some exemplary embodiments of the subject matter.

On Step 210, a latency constraint on a CEP computation may be received. The latency constraint may specify maximal response time from receipt of an input event to emission of the derived output event. The latency constraint may relate to a computation path in an EPN. The latency constraint may be imposed by an end user, a developer, a client or contracting party to a Service Level Agreement (SLA), or the like.

On Step 220, a relative latency contributed by each EPA on the CEP computation path may be estimated. A naïve estimation may be used initially and adjusted further ahead based on observed measurements during run time or over successive executions.

On Step 224, a latency budget for each EPA on the CEP computation path may be determined based on the relative latency estimated on Step 220 and the maximal total latency received on Step 210.

On Step 230, the progress of the CEP computation may be monitored to check that latency limits are satisfied.

On Step 232, the actual latency of each EPA may be monitored to determine whether the EPA can complete the computation within the budgeted latency determined on Step 224. The actual latency of the EPA may be monitored by registering the time of receiving the first input event, either from an event provider or another EPA, and the time of emitting the corresponding derived/output event to yet another EPA or an event consumer. In case the EPA completes the computation earlier than the budgeted limit, the latency budget for one or more remaining EPAs along the computation path may be updated accordingly.

On Step 236, a confidence level associated with each of the one or more potential results of the CEP computation or an EPA along the path, may be updated based on partial results of the CEP computation thus far.

On Step 240, a determination may be made of whether there is a risk of exceeding the latency limit per the latency constraint received on Step 210, or the latency budget of an EPA as determined on Step 224 or as updated on Step 232. The determination may be made either prior to the computation or during it.

On Step 250, in case of a positive determination on Step 240 of such risk existing, one or more potential results of the respective EPA may be emitted. In some exemplary embodiments, only the most certain potential result may be emitted. In some exemplary embodiments, the one or more potential results may be emitted immediately without performing the computation. Alternatively, the computation may be performed notwithstanding until time runs out or before, in order to improve the confidence level for the derived potential event. In some exemplary embodiments, the computation may be stopped, or paused and resumed later if sufficient time remains.

On Step 260, respective confidence levels of the one or more potential results emitted on Step 250 may be emitted as well.

Figure 3:
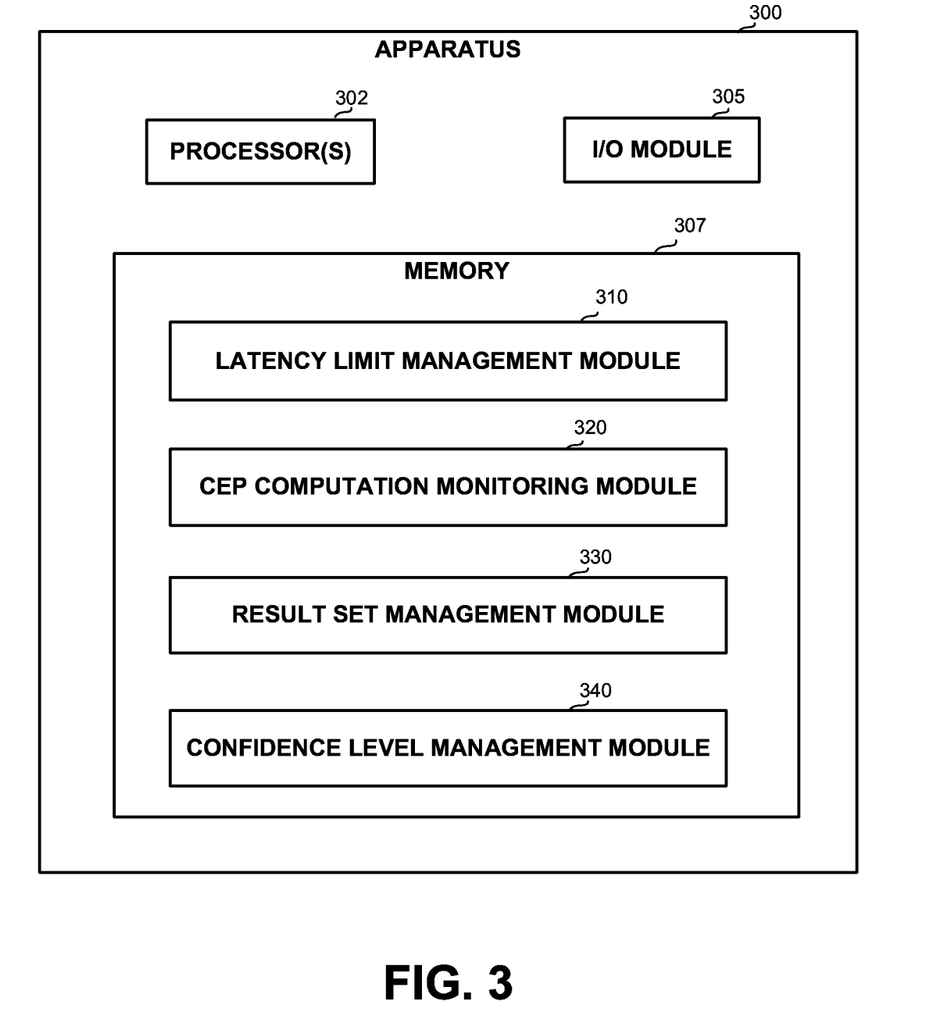
FIG. 3 shows a block diagram of an apparatus, in accordance with some exemplary embodiments of the disclosed subject matter.

Referring now to FIG. 3 showing a block diagram of an apparatus in accordance with some exemplary embodiments of the disclosed subject matter.

In some exemplary embodiments, Apparatus 300 may comprise one or more Processor(s) 302. Processor 302 may be a Central Processing Unit (CPU), a microprocessor, an electronic circuit, an Integrated Circuit (IC) or the like. Processor 302 may be utilized to perform computations required by Apparatus 300 or any of it subcomponents.

In some exemplary embodiments of the disclosed subject matter, Apparatus 300 may comprise an Input/Output (I/O) Module 305. I/O Module 305 may be utilized to provide an output to and receive input from a user or another apparatus similar to Apparatus 300.

In some exemplary embodiments, Apparatus 300 may comprise a Memory 307. Memory 307 may be a hard disk drive, a Flash disk, a Random Access Memory (RAM), a memory chip, or the like. In some exemplary embodiments, Memory 307 may retain program code operative to cause Processor 302 to perform acts associated with any of the subcomponents of Apparatus 300.

In some exemplary embodiments, Apparatus 300 may comprise or be in communication with a CEP Engine (not shown), configured for performing CEP computations, such as the CEP computation represented by EPN 100 of FIG. 1.

Latency Limit Management Module 310 may be configured for receiving a latency constraint on a CEP computation. In some exemplary embodiments, Latency Limit Management Module 310 may be configured for determining a latency budget for each EPA on the computation path. Latency Limit Management Module 310 may be further configured for estimating a relative latency contributed by each EPA and determine the latency budget based on the estimated relative latency and the total latency constraint received.

CEP Computation Monitoring Module 320 may be configured for monitoring the progress of the CEP computation. CEP Computation Monitoring Module 320 may determine whether a risk of exceeding a latency limit received or determined by Latency Limit Management Module 310 exists. In some exemplary embodiments, CEP Computation Monitoring Module 320 may be configured for monitoring the actual latency of an EPA. CEP Computation Monitoring Module 320 may be further configured for updating Latency Limit Management Module 310 in case the EPA completed the computation earlier than the budgeted time, so that Latency Limit Management Module 310 may redistribute the latency budget among one or more remaining EPAs along the computation path.

Result Set Management Module 330 may be configured for maintaining a set of one or more potential results for the CEP computation or for each of the EPAs. Result Set Management Module 330 may be configured for emitting one or more of the potential results responsive to a positive risk of latency constraint violation being determined by CEP Computation Monitoring Module 320. In some exemplary embodiments, Result Set Management Module 330 may be configured for emitting only the result with the highest confidence level associated thereto. In some exemplary embodiments, one or more EPAs may be associated with different functions of varying performance rates, such as accuracy, speed, and the like, and Result Set Management Module 330 may be configured for selecting a function whereby an optimal result in accordance with given target metrics may be achieved. Result Set Management Module 330 may be configured for performing the optimal function selection either off-line or dynamically during computation based on the progress thereof as monitored by CEP Computation Monitoring Module 320 and/or updated latency limits maintained by Latency Limit Management Module 310.

Confidence Level Management Module 340 may be configured for maintaining respective confidence level for each of the one or more potential results maintained by Result Set Management Module 330 for the CEP computation or for each of the EPAs. Confidence Level Management Module 340 may be configured for emitting the corresponding confidence level of each potential result emitted by Result Set Management Module 330 responsive to a determination by CEP Computation Monitoring Module 320 that a risk of exceeding a latency limit exists. In some exemplary embodiments, Confidence Level Management Module 340 may be further configured to update the confidence level(s) based on partial results of the CEP computation as monitored by CEP Computation Monitoring Module 320. In some exemplary embodiments, Confidence Level Management Module 340 may be configured to propagate the uncertainty of incoming events into the emitted derived events and associated confidence level thereof in a probabilistically coherent manner. Alternatively, Confidence Level Management Module 340 may be configured to eliminate the uncertainty prior to derivation, by screening uncertain events according to a predefined policy.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
   receiving a latency constraint on a Complex Event Processing (CEP) computation;
   monitoring progress of the CEP computation to determine a risk of violating the latency constraint, wherein monitoring the progress of the CEP computation comprises redistributing a latency budget for a completed calculation by a first event processing agent (EPA) among latency budgets of one or more downstream EPAs along a computation path of the CEP computation;
   responsive to determining that a risk of violating the latency constraint exists, suspending the CEP computation and outputting at least one possible result of the CEP computation, the latency constraint corresponding to a combination of at least one timeout value and a join operation; and maintaining a state of a sub-network calculating the CEP computation following a timeout event.

2. The computer-implemented method of claim 1, further comprising maintaining a confidence level for each possible result of the CEP computation.

3. The computer-implemented method of claim 2, further comprising updating the confidence level dynamically based on the progress of the CEP computation.

4. The computer-implemented method of claim 2, further comprising outputting the confidence level for each of the at least one possible result.

5. The computer-implemented method of claim 2, wherein the at least one possible result consists of the result having the highest confidence level.

6. The computer-implemented method of claim 2, wherein said outputting is conditioned on the confidence level exceeding a predetermined threshold.

7. The computer-implemented method of claim 1, further comprising halting the CEP computation in addition to said outputting.

8. The computer-implemented method of claim 1, wherein the CEP system comprises a plurality of Event Processing Agents (EPAs) configured to receive one or more input events from either an event producer or another EPA and to provide an output event to an event consumer or another EPA, thereby forming the computation path of the CEP computation, wherein the method further comprises:

obtaining the latency budget for each EPA along the path of the CEP computation;

monitoring the latency of each EPA to determine whether the EPA is to complete computation within the latency budget; and, responsive to determining the EPA not completing computation within the latency budget, emitting at least one possible output of the EPA.

9. The computer-implemented method of claim 8, further comprising emitting confidence level associated with the at least one possible output.

10. The computer-implemented method of claim 8, further comprising halting the computation by the EPA in addition to said emitting.

11. The computer-implemented method of claim 8, wherein said obtaining comprises: estimating, for each EPA along the path of the CEP computation, a relative latency contributed by the EPA; and, computing the latency budget for each EPA, based on the latency constraint and relative latency.

12. The computer-implemented method of claim 8, further comprising: responsive to the EPA completing computation earlier than the latency budget thereof, updating the latency budget of the EPAs along the remainder of the path of the CEP computation.

13. The computer-implemented method of claim 12, wherein said updating is performed in accordance with the relative latencies.

14. The computer-implemented method of claim 8, wherein each EPA is associated with a set of functions having different performance characteristics and accuracy level, wherein a function from the set is dynamically selected for execution to optimize accuracy under the latency constraint.

15. The computer-implemented method of claim 1, comprising skipping at least one portion of the CEP computation in response to determining that the at least one portion of the CEP computation cannot be completed in time.

16. A computerized apparatus having a processor, the processor being adapted to perform the steps of:

receiving a latency constraint on a Complex Event Processing (CEP) computation;

monitoring progress of the CEP computation to determine a risk of violating the latency constraint, wherein monitoring the progress of the CEP computation comprises redistributing a latency budget for a completed calculation by a first event processing agent (EPA) among latency budgets of one or more downstream EPAs along a computation path of the CEP computation;

responsive to determining that a risk of violating the latency constraint exists, suspending the CEP computation and outputting at least one possible result of the CEP computation, the latency constraint corresponding to a combination of at least one timeout value and a join operation; and maintaining a state of a sub-network calculating the CEP computation following a timeout event.

17. The computerized apparatus of claim 16, wherein the processor is further adapted for maintaining a confidence level for each possible result of the CEP computation.

18. The computerized apparatus of claim 17, wherein the processor is further adapted for outputting the confidence level for each of the at least one possible result.

19. The computerized apparatus of claim 16, wherein the CEP system comprises a plurality of Event Processing Agents (EPAs) configured to receive one or more input events from either an event producer or another EPA and to provide an output event to an event consumer or another EPA, thereby forming the computation path of the CEP computation, wherein the processor is further adapted for:

obtaining the latency budget for each EPA along the path of the CEP computation;

monitoring the latency of each EPA to determine whether the EPA is to complete computation within the latency budget; and, responsive to determining the EPA not completing computation within the latency budget, emitting at least one possible output of the EPA.

20. The computerized apparatus of claim 19, wherein said obtaining comprises: estimating, for each EPA along the path of the CEP computation, a relative latency contributed by the EPA; and, computing the latency budget for each EPA, based on the latency constraint and relative latency.

21. A non-transitory computer program product comprising a computer readable storage medium retaining program instructions, which program instructions when read by a processor, cause the processor to perform a method comprising:

receiving a latency constraint on a Complex Event Processing (CEP) computation;

monitoring progress of the CEP computation to determine a risk of violating the latency constraint, wherein monitoring the progress of the CEP computation comprises redistributing a latency budget for a completed calculation by a first event processing agent (EPA) among latency budgets of one or more downstream EPAs along a computation path of the CEP computation;

responsive to determining that a risk of violating the latency constraint exists, suspending the CEP computation and outputting at least one possible result of the CEP computation, the latency constraint corresponding to a combination of at least one timeout value and a join operation; and maintaining a state of a sub-network calculating the CEP computation following a timeout event.

\* \* \* \* \*